June 23, 1942.  F. DE L. BROWN  2,287,290
MOBILE UNIT
Filed June 10, 1939  5 Sheets-Sheet 1
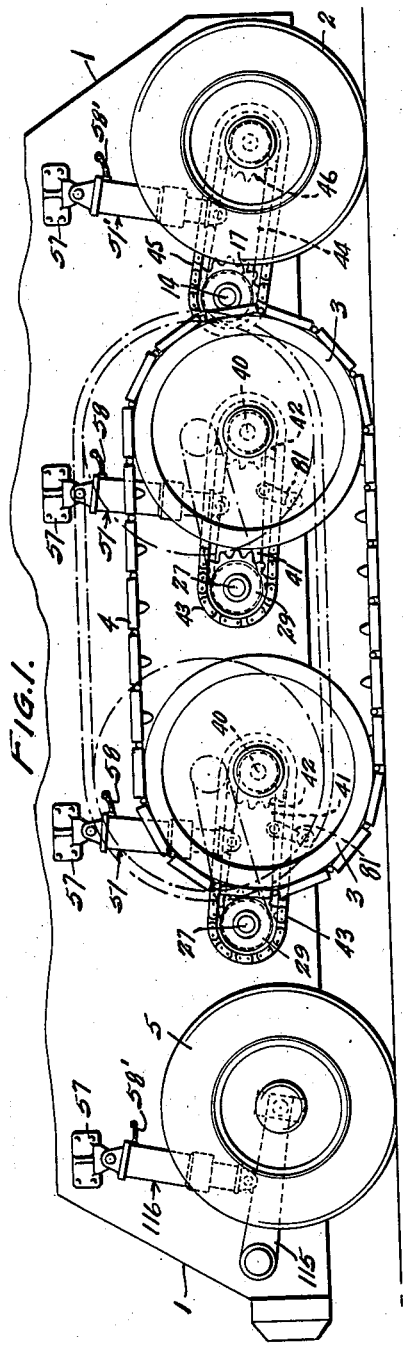
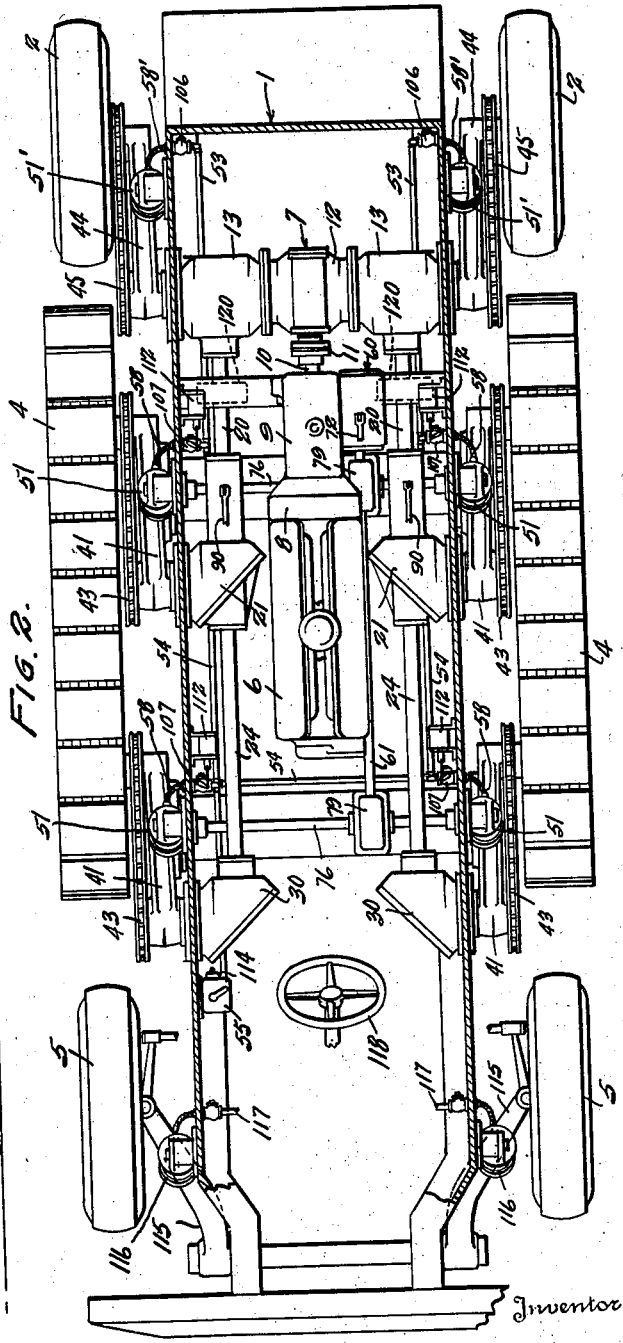
Inventor
FLOYD deL. BROWN
By Semmes, Keegin & Semmes
Attorneys

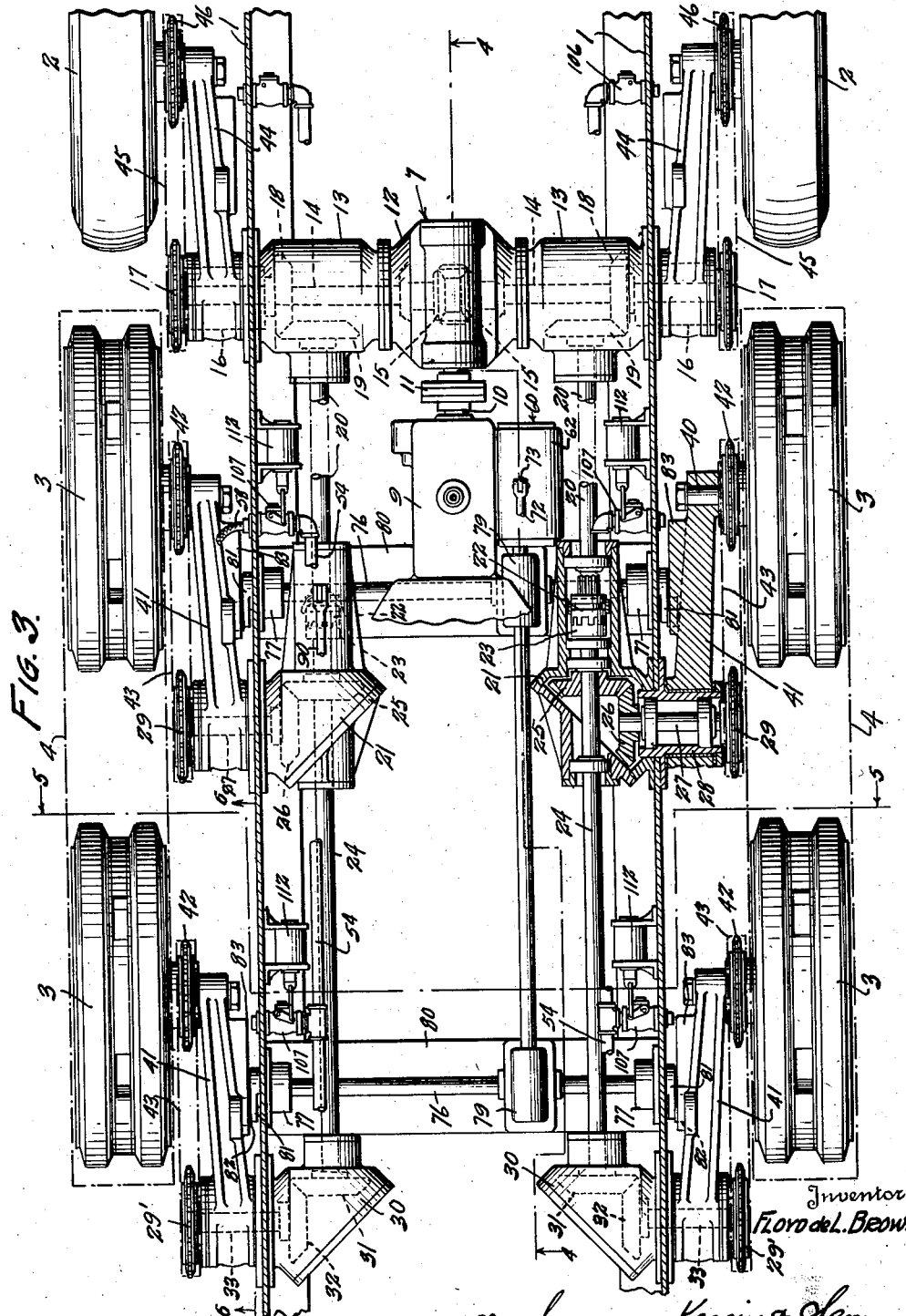

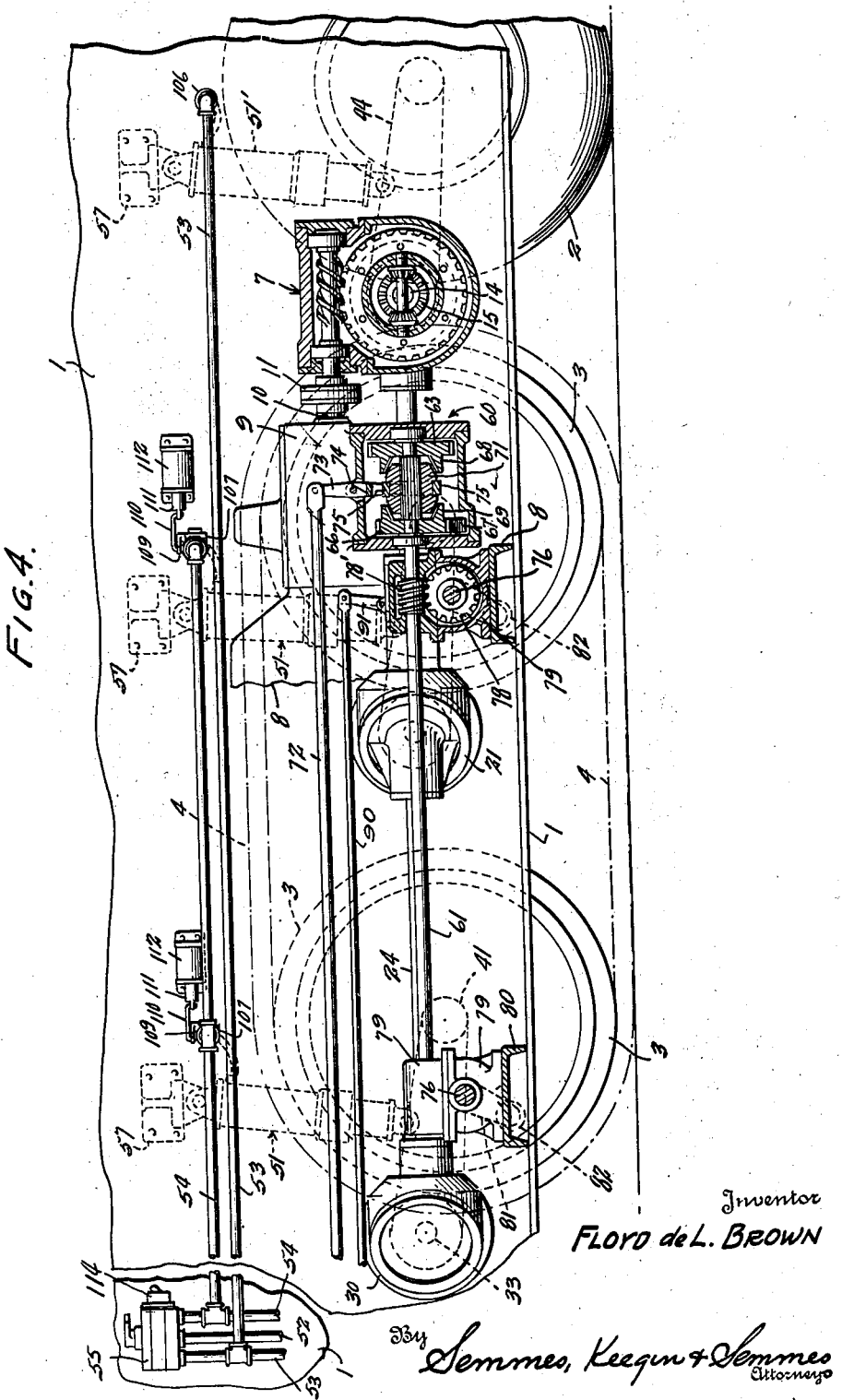

June 23, 1942.  F. DE L. BROWN  2,287,290
MOBILE UNIT
Filed June 10, 1939  5 Sheets-Sheet 4
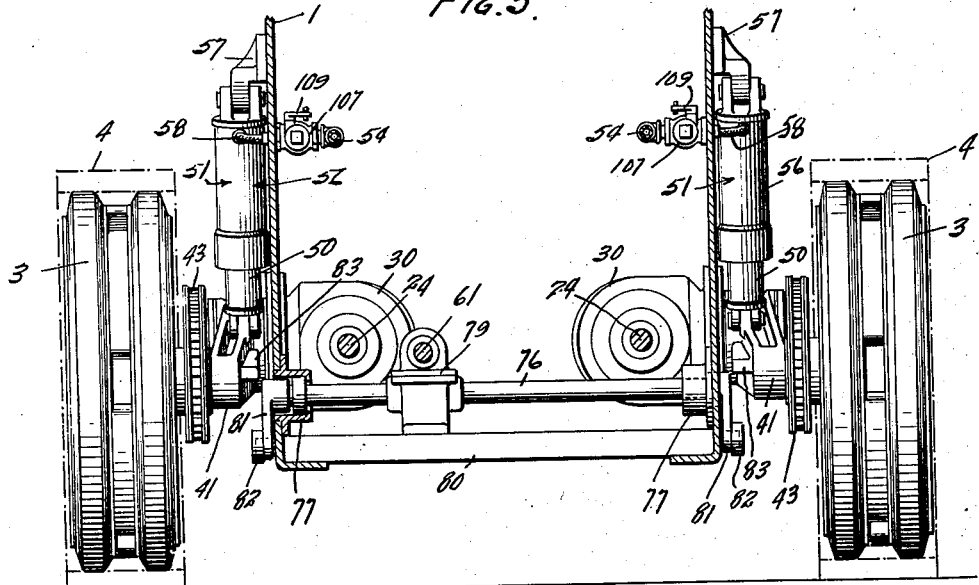
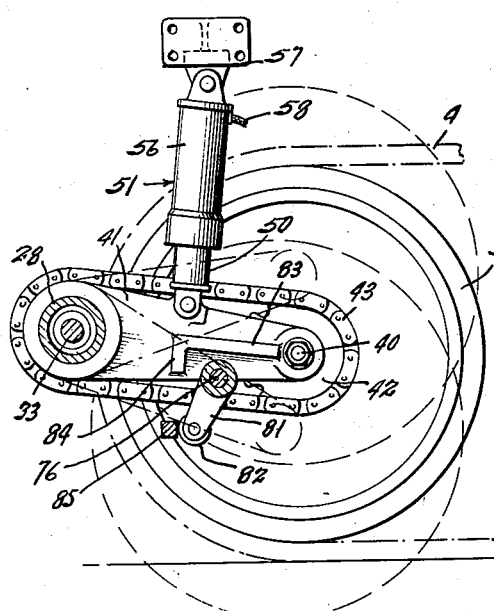
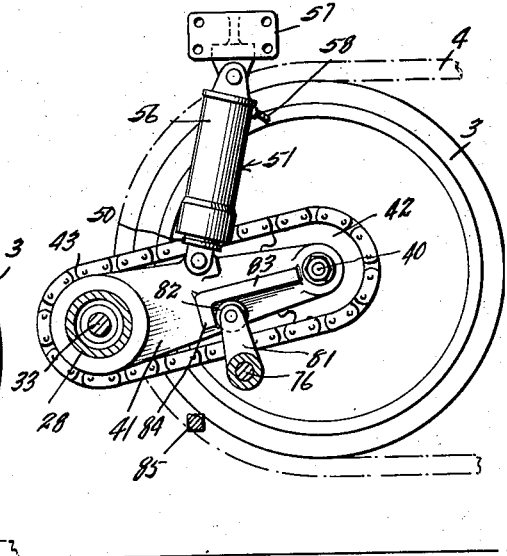
Inventor
FLOYD deL. BROWN
By Semmes, Keegin & Semmes
Attorneys June 23, 1942.　　　F. DE L. BROWN　　　2,287,290
MOBILE UNIT
Filed June 10, 1939　　　5 Sheets-Sheet 5
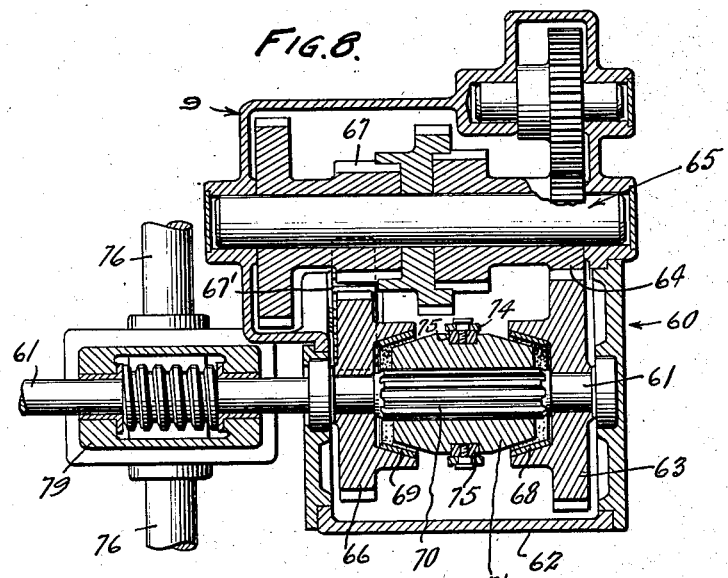
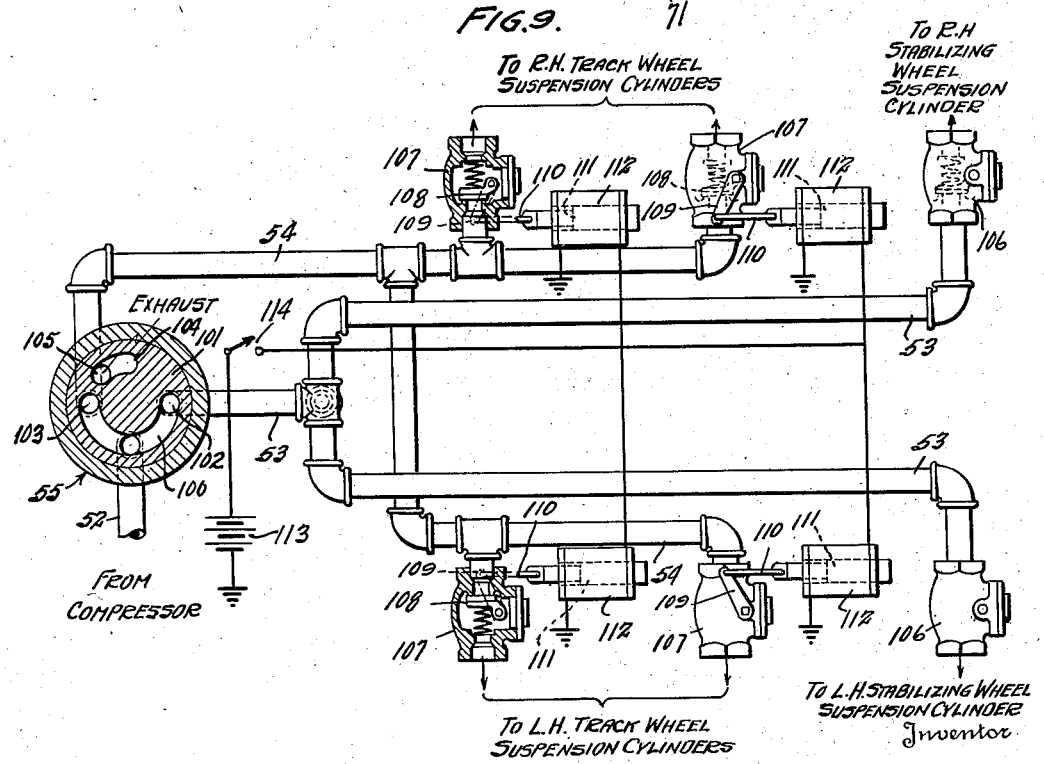
Inventor
Floyd de L. Brown
By Semmes, Keegin & Semmes
Attorneys Patented June 23, 1942

2,287,290

UNITED STATES PATENT OFFICE 2,287,290

MOBILE UNIT

Floyd de L. Brown, New York, N. Y.

Application June 10, 1939, Serial No. 278,570

10 Claims. (Cl. 180—9.1)

Generically, this invention relates to an automotive unit provided with a plurality of wheel assemblies and specifically relates to means for utilizing a caterpillar drive in addition to a regular wheel drive. While this application illustrates my inventive concept employed in connection with a tank, it is, of course, to be understood that it is of much broader application and can be used with many types of automotive vehicles.

An object of this invention is to provide a mobile unit employing, in addition to the regular drive wheels, a caterpillar drive, both the regular drive and the caterpillar drive being operated from a single power plant.

Another object of this invention is to provide a mobile unit employing a caterpillar drive in addition to a regular drive with means whereby the caterpillar drive can be raised from engagement with the surface being traversed and then permitting the unit to be driven by means of the regular drive wheels.

Yet a further object of this invention is to provide a mobile unit with a caterpillar drive in addition to the regular drive wheels, the caterpillar drive being adapted to be moved out of engagement with the surface being traversed, thereby permitting the unit to be driven by the regular drive wheels, and means whereby the caterpillar drive is disengaged from the power unit when it is raised.

A still further object of this invention is to provide a novel retracting mechanism for a mobile unit wherein the caterpillar drive wheels may be raised from a ground engaging position and lowered when increased traction is desired.

A further object of this invention is to provide a novel retraction mechanism for raising the drive wheels of a mobile unit that is operated by a power take-off associated with the transmission of the mobile unit.

To achieve the above and other objects, the present invention in general embraces the idea of providing a mobile unit with a pair of regular drive wheels, a caterpillar drive and a pair of forward steering wheels. Each of the above mentioned wheel assemblies is resiliently suspended to the frame of the mobile unit. The regular drive wheels and the caterpillar drive are operated from the power plant of the unit and means are provided whereby the caterpillar drive can be raised from its ground engaging position, thus permitting the unit to be driven by means of the regular drive wheels. In addition, the caterpillar drive is disengaged from the power plant when in its raised or inoperative position.

Furthermore, there is provided a novel retraction mechanism for raising the caterpillar drive that is operated through a power take-off from the transmission of the mobile unit.

In order to make my invention more clearly understood, I have shown in the accompanying drawings means for carrying the same into practical effect without limiting the improvements in their useful applications to the particular constructions, which, for the purpose of explanation, have been made the subject of illustration.

Figure 1 is a side elevational view, partly broken away, depicting my mobile unit.

Figure 2 is a top plan view, partly in section, of the mobile unit shown in Figure 1.

Figure 3 is a partial top plan view, partly in section, and illustrating the wheel driving, raising and disengaging mechanism.

Figure 4 is a view taken along the line 4—4 of Figure 3 looking in the direction of the arrows.

Figure 5 is a view taken along the line 5—5 of Figure 3 looking in the direction of the arrows.

Figure 6 is a view taken along the line 6—6 of Figure 3 looking in the direction of the arrows.

Figure 7 is a view similar to Figure 6 illustrating the wheel in raised position with respect to the ground.

Figure 8 is a horizontal sectional view showing the power take-off from the transmission for elevating and lowering the caterpillar drive wheels.

Figure 9 is a diagrammatic view illustrating the mechanism to relieve the pressure in each compression unit associated with the caterpillar drive.

Referring to the drawings, the numeral 1 represents the frame of a mobile unit which is supported by a pair of rear wheels 2, a plurality of intermediate wheels 3 which drive an endless ground engaging track 4 and a pair of forward steering wheels 5. All of the above wheels are resiliently suspended to the frame 1.

The unit is also provided with a power plant 6 of the internal combustion type which imparts motion to a differential gear 7 through a clutch 8, speed transmission 9, drive shaft 10 and suitable coupling 11. The housing 12 of the differential is supported on each side by distribution gear housings 13 which are in turn connected to the frame 1.

As best shown in Figure 3, a pair of shafts 14, adapted to receive differential torque from the gear 7, have their inner ends attached to gears 15 which form a part of the differential gear. These shafts extend through the housings 13 and project through and are journaled in tubular bosses 16 attached to the frame 1. The projecting end of each shaft 14 carries a sprocket 17 for driving each of the rear wheels 2 in a manner to be described later for all of the driving wheels of the unit.

Each shaft 14 carries a bevel gear 18, disposed within the housing 13 which meshes with a bevel gear 19 carried by one end of a forwardly extending shaft 20 journaled in the housing 14. The opposite end of the shaft 20 is journaled in an extension of a gear housing 21 rigidly attached to the frame 1. The forward end of this shaft is splined to receive a sliding clutch member 22. The clutch member 22 is adapted to engage and drive a coacting clutch member 23 fixed to one end of a shaft 24 also journaled within the housing 21 and in coaxial alignment with the shaft 20.

The shaft 24 carries a bevel gear 25, disposed within the housing 21, which meshes with a bevel gear 26 carried by one end of a short transverse shaft 27. The shaft 27 is journaled in and extends through a tubular boss 28 similar to boss 16, attached to the frame 1 and carries on its outer end a sprocket 29.

The forward end of the shaft 24 is journaled in a gear housing 30 and has affixed thereto a bevel gear 31 which meshes with a bevel gear 32 to drive a transverse shaft 33 journaled similarly to the shaft 27. The outer end of the shaft 33 carries a driving sprocket 29'.

Each of the wheels 3 is mounted for rotation on a stub axle 40 carried by the free end of a radial arm 41. The opposite end of the arm 41 is pivotally attached to the tubular boss 28. A driven sprocket 42 is concentrically attached to the inner side of each wheel 3 and is connected with the driving sprocket 29 by a chain 43.

The rear wheels 2 are mounted and are driven in a manner similar to the wheels 3. These wheels are mounted for rotation on the free ends of radial arms 44 which are pivotally attached to the tubular bosses 16. A chain 45 connects the driving sprocket 17 with a driven sprocket 46 carried by the wheel hub.

To provide stability to the mobile unit and maximum traction for all driving wheels, each radial arm 41 and 44 has attached intermediate its ends, one end of a piston 50 which forms a part of a resilient suspension element 51. The suspension elements 51 are of pneumatic type and are supplied with compressed air from a suitable compressor, not shown, through pipe lines 52, 53 and 54 and a distribution valve 55. The cylinder portion 56 of the element 51 is pivotally connected to the frame 1 by a bracket or similar fixture 57. Flexible conduits 58 connect each cylinder 56 with the source of compressed air.

To provide an efficient means for moving the track unit 3—4 out of and into ground engagement there is provided the raising and lowering mechanism which is best shown in Figures 4 through 8. A power take-off, indicated generally as 60, is operatively connected with the speed transmission 9. This comprises a longitudinal shaft 61 journaled in an offset extension 62 of the transmission housing and extending forwardly therefrom. The shaft 61 carries an idler gear 63 in mesh with the reverse pinion 64 of the transmission counter-shaft 65. A second gear 66 also carried to idle on the shaft 61 is positioned in longitudinal spaced relation to the gear 63. The gear 66 is in driving connection with a supplemental pinion 67, on the transmission counter-shaft through a reverse idler 67'. Thus it will be seen that the gears 63 and 66 will be driven in opposite directions. Each of the gears 63 and 66 is provided with a female conical clutch face 68 and 69, respectively.

The portion of the shaft 61 between the gears 63 and 66 is splined as at 70 to receive a sliding, double ended male clutch member 71. The clutch member 71 is adapted to move to engage either of the clutch faces 68 or 69 to rotate the shaft 61 in either a clockwise or counter-clockwise direction. This movement is made by the operator of the vehicle through a rod 72 which extends rearwardly of the vehicle and is connected to one end of a lever 73 pivoted in the housing 62. The opposite end of the lever 73 is provided with a yoke 74 coacting with a collar 75 surrounding the clutch member 71.

At a point adjacent each of the track wheel arms 41 is positioned a shaft 76 which extends transversely across and through the frame 1 and is journaled in bearings 77 affixed in the side walls thereof. The inboard portion of each of these shafts 76 carries a worm gear 78 attached thereto and contained within a housing 79 secured to a portion 80 of the frame. Each of the gears 78 meshes with a worm 78' carried and driven by the shaft 61.

The outboard ends of each of the shafts have attached thereto a radial arm 81, the free end of which carries a roller 82. The rollers 82 are adapted upon rotation of the shafts 76 to move into the path of and engage a flanged projection 83 provided on the inner face of each of the radial wheel arms 41 to raise the track 4 from the ground engaging position shown in Figure 6 to an elevated position shown in Figure 7. The raised position of the arm is limited by the roller 82 engaging a downturned portion 84 of the projection 83 which is so positioned that when the wheel arm 41 is in its raised position the axis of the arm 82 will be slightly past the perpendicular to the axis of the arm 41 to maintain its raised position. The lowered position of the arms 82 is limited by stops 85 attached to the frame 1 in such location that the rollers 83 will not interfere with the normal movement of the wheel arms in their ground engaging positions.

When the tracks 4 are in their elevated position, it is desirable that the driven mechanism be disconnected from this portion of the unit. This may be accomplished by the operator of the vehicle by sliding the clutch members 22 out of engagement with the members 23 thus disconnecting the driving shafts 24 from the source of power. Conventional means to accomplish this are provided which may comprise operating rods 90 connected to pivoted levers 91 which rock to slide the clutch member 22 into and out of engagement.

As previously stated, each of the wheels supports a portion of the weight of the vehicle through a pneumatic suspension element 51 by a column of compressed air therein. To facilitate raising the track wheels 3 the air pressure in their suspension cylinders must first be relieved.

Air from the compressor is forced through the pipe line 52 into the distribution valve 54 where it is divided in an arcuate duct 100 in the rotor 101 of this valve and diverted into ports 102 and 103 which communicate with the pipe lines 53 and 54, respectively. The valve rotor 101 is also provided with an arcuate duct 104 adapted, upon rotation of the valve, to connect the port 103 with an exhaust port 105.

The pipe line 53 leads to and connects with the suspension cylinder 51' of each of the rear wheels 2 through a spring loaded check valve 106 and flexible conduits 58'. The line 54 connects with the suspension cylinder of each of the track wheels 3 through a spring loaded check valve 107 and the flexible conduit 58.

The pivoted shutter 108 of each of the valves 107 is connected through an arm 109 and link 110 to the plunger 111 of a solenoid 112. These solenoids are connected parallel and in series with a source of current 113 and a suitable switch 114. Closing the switch 114 energizes the solenoids 112 to open the check valves 107 to return communication with the pipe line 54.

The front wheels 5 are pivoted for cramping movement to radial arms 115 pivoted to the frame 1 and suspended therefrom by compression elements 116, similar in construction to the elements 51, which are connected to the source of compressed air by piping 117 connected with the pipe line 53. Steering the vehicle by means of these wheels may be accomplished in any conventional manner through a steering wheel 118.

Suitable brake mechanism indicated by the drums 120 in Figure 2 may be provided on the shafts 20 for retarding the vehicle. In operating the mobile unit under heavy load conditions or over rough terrain the track 4 is in its ground engaging position and performs the main propulsion means, the rear wheels 2 acting principally as stabilizing wheels. In this mode of propulsion, power is taken from the engine 6 through clutch 8, speed transmission 9, coupling 10, to the differential gear 7. Thence it is transmitted to the rear wheels 2, through shafts 14, sprockets 17 and 46, and chain 45.

The shafts 14 also transmit their torque through distribution gears 18 and 19 to shafts 20, thence through clutch 22—23 to shafts 24. The shafts 24 drive the track wheels 3 through gears 25, 26, shafts 27, sprockets 29 and 42, and chain 43.

When the vehicle is being driven over smooth roadways, or when, for other purposes, it becomes desirable to raise the track out of ground engagement, the operator first actuates the valve 55 to change the port 103 from communication with the air inlet line 52 and connect it with the exhaust port 105. He next closes the electric circuit to the solenoids 112 to open the check valves 107 to release the pressure in the elements 51 by exhausting the air therein through pipes 54, duct 104, and port 105.

The clutch member is then brought into engagement with the clutch face 68 on the raising gear 63 which imparts torque to the transverse shafts 76 through the shaft 61 and worm and gear 78—78'. The rollers 82 carried by the arms 81 on the ends of the shafts 76 then engage the flanges 83 to move the arms 41 to their elevated positions where they remain by gravity forcing the rollers into engagement with the stop 84. The driving mechanism for the track wheels 3 is then disconnected from the source of power by disengaging the clutch 22—23.

To lower the track, the clutch member is moved into engagement with the clutch face 64 on the reverse gear 66 to reverse the movement of the wheel raising arms 82 to lower the wheels into ground position. The valve 55 is returned to its original position and the pressure is again built up in the suspension elements 51. The drive is again connected to the track by re-engaging the clutch 22—23.

It will be readily appreciated from the above description that I have devised an automotive unit that is provided with a caterpillar drive in addition to the regular drive. Both the caterpillar drive and the regular drive are actuated by the power plant of the unit. In addition, means are provided whereby the caterpillar drive can be raised from its ground engaging position to permit the unit to be driven by the regular drive. When the caterpillar drive is in its raised position, it is disconnected from the power plant of the unit. Also, I have incorporated in my unit a novel retraction mechanism for raising the caterpillar drive that is operated by means of a power take-off from the transmission of the unit.

While I have shown and described the preferred embodiment of my invention. I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In a mobile unit having a transmission, a supporting frame and a main drive mechanism; a plurality of pairs of freely suspended track-connected drive wheel assemblies; power take-off means from the transmission to raise the said pairs of track-connected drive wheel assemblies; said power take-off means comprising a shaft extending longitudinally of the supporting frame, a raising gear provided with a recessed clutch surface and freely spinning on said shaft, a lowering gear provided with a recessed clutch surface and freely spinning on said shaft in a direction opposite to said raising gear, a cone gear fixed to said shaft intermediate said raising and lowering gears, means to selectively engage said cone-shaped gear with the said raising and lowering gears to rotate the longitudinal shaft, a pair of worms mounted on said longitudinal shaft in spaced relation, a pair of transverse shafts supported by the said frame, a worm wheel mounted on each of said transverse shafts and engaging with each of said worms, a crank mounted on both ends of each of said transverse shafts to engage each of said track-connected wheel assemblies when rotated in a counter-clockwise direction; and clutch means to disconnect the track-connected drive wheel assemblies from the main drive mechanism.

2. In a mobile unit having a transmission, a supporting frame and a main drive mechanism; a plurality of pairs of freely suspended track-connected drive wheel assemblies; each of which supports a portion of the weight of the mobile unit against the tension of a compression unit; means to supply pressure to each compression unit; means to relieve the pressure in each compression unit; power take-off means from the transmission to raise the said pairs of track-connected drive wheel assemblies; said power take-off means comprising a shaft extending longitudinally of the supporting frame, a raising gear provided with a recessed clutch surface and freely spinning on said shaft, a lowering gear provided with a recessed clutch surface and freely spinning on said shaft in a direction opposite to said raising gear, a cone gear fixed to the longitudinal shaft intermediate said raising and lowering gears, means to selectively engage said cone-shaped gear with the said raising and lowering gears to rotate the longitudinal shaft, a pair of worms mounted on said longitudinal shaft in spaced relation, a pair of transverse shafts supported by the said frame, a worm wheel mounted on each of said transverse shafts and engaging with each of said worms, a crank mounted on both ends of each of said transverse shafts to engage each of said track-connected wheel assemblies when rotated in a counter-clockwise direction; and clutch means to disconnect the track-connected drive wheel assemblies from the main drive mechanism.

3. In a mobile unit having a power unit, a supporting frame and a main drive mechanism; a plurality of pairs of freely suspended track-connected drive wheel assemblies, power take-off means from the power unit to raise the said pairs of track-connected wheel assemblies; said power take-off means comprising a shaft extending longitudinally of the supporting frame, a raising gear freely spinning on the shaft, a lowering gear freely spinning on the shaft in a direction opposite to said raising gear, a gear fixed to said shaft intermediate said raising and lowering gears, means to selectively engage said fixed gear with the said raising and lowering gears to rotate the said shaft, a pair of gears mounted on the shaft in spaced relation, a pair of transverse shafts supported by the said frame, a torque transmitting means mounted on each of the said transverse shafts and engaging with each of the last mentioned gears, a crank mounted on both ends of each of the transverse shafts, each crank being adapted to engage one of the said track-connected wheel assemblies when the transverse shaft on which it is mounted is rotated, and means to disconnect the track-connected drive wheel assemblies from the main drive mechanism.

4. In a mobile unit having a power unit, a supporting frame and a main drive mechanism; a plurality of pairs of freely suspended track-connected drive wheel assemblies, power take-off means from the power unit to raise the said pairs of track-connected wheel assemblies; said power take-off means comprising a shaft extending longitudinally of the supporting frame, a raising gear provided with a clutch surface and freely spinning on said shaft, a lowering gear provided with a clutch surface and freely spinning on said shaft in a direction opposite to said raising gear, a clutch member rigidly fixed to said shaft intermediate said raising and lowering gears, means to selectively engage the clutch surface of said clutch member with said raising and lowering gears to rotate the longitudinal shaft, a pair of worm gears mounted on said longitudinal shaft in spaced relation, a pair of transverse shafts supported by the said frame, a torque transmitting means on each of said transverse shafts and engaging with each of said worm gears, a crank mounted on both ends of each of the said transverse shafts, means associated with each of the wheel assemblies, each of said cranks when rotated being adapted to engage one of said means to raise said track-connected wheel assemblies, and means to disconnect the track-connected wheel assemblies from the main drive mechanism.

5. In a mobile unit having a transmission, a supporting frame and a main drive mechanism; a plurality of pairs of freely suspended track-connected drive wheel assemblies; power take-off means from the transmission to raise the said pairs of track-connected drive wheel assemblies; said power take-off means comprising a shaft extending longitudinally of the supporting frame, a raising gear provided with a recessed clutch surface and freely spinning on said shaft, a lowering gear provided with a recessed clutch surface and freely spinning on said shaft in a direction opposite to said raising gear, a clutch member splined to said shaft intermediate said raising and lowering gears, means to selectively engage the clutch surface of said clutch member with the said raising and lowering gears to rotate the longitudinal shaft, a pair of worms mounted on said longitudinal shaft in spaced relation, a pair of transverse shafts supported by the said frame, a worm wheel mounted on each of said transverse shafts and engaging with each of said worms, a crank mounted on both ends of each of said transverse shafts, a projecting flange mounted on each of the said track-connected wheel assemblies, each of said cranks being adapted when rotated in one direction to engage one of the said flanges and raise the wheel assembly, a stop mounted on each wheel assembly to limit the movement of the said crank, and clutch means to disconnect the track-connected wheel assemblies from the main drive mechanism.

6. In a mobile unit having a power unit, a supporting frame and a main drive mechanism; a plurality of pairs of freely suspended track-connected drive wheel assemblies; each of which supports a portion of the weight of the mobile unit against tension of a compression unit; means to supply pressure to each compression unit; means to relieve the pressure in each compression unit; power take-off means from the power unit to raise the said pairs of track-connected drive wheel assemblies; said power take-off means comprising a shaft extending longitudinally of the supporting frame, a raising gear provided with a clutch surface and freely spinning on said shaft, a lowering gear provided with a clutch surface and freely spinning on said shaft in a direction opposite to said raising gear, a clutch member fixed to the longitudinal shaft intermediate said raising and lowering gears, means to selectively engage the clutch surface of said clutch member with the said raising and lowering gears to rotate the longitudinal shaft, a pair of worms mounted on said longitudinal shaft in spaced relation, a pair of transverse shafts supported by the said frame, torque transmitting means mounted on each of the said transverse shafts and engaging with each of the said worms, a crank mounted on both ends of each of said transverse shafts, a flange mounted on each of the track-connected wheel assemblies, each of said cranks being adapted when rotated in one direction to engage one of the said flanges and raise the wheel assembly, and means to disconnect the track-connected wheel assemblies from the main drive mechanism.

7. In a mobile unit having a power unit, a supporting frame and a main drive mechanism; a plurality of pairs of freely suspended track-connected drive wheel assemblies, power take-off means from the power unit to raise the said pairs of track-connected wheel assemblies; said power take-off means comprising a shaft extending longitudinally of the supporting frame, a raising gear freely spinning on the shaft, a lowering gear freely spinning on the shaft in a direction opposite to said raising gear, a gear fixed to said shaft intermediate said raising and lowering gears, means to selectively engage said fixed gear with the said raising and lowering gears to rotate the said shaft, a pair of gears mounted on the shaft in spaced relation, a pair of transverse shafts supported by the said frame, a torque transmitting means mounted on each of the said transverse shafts and engaging with each of the last mentioned gears, means mounted on both ends of each of the transverse shafts, each means being adapted to engage one of the said track-connected wheel assemblies when the transverse shaft on which it is mounted is rotated.

8. In a mobile unit having a power unit, a supporting frame and a main drive mechanism; a plurality of pairs of freely suspended track-connected drive wheel assemblies, power take-off means from the power unit to raise the said pairs of track-connected wheel assemblies; said power take-off means comprising a shaft extending longitudinally of the supporting frame, a raising gear freely spinning on the shaft, a lowering gear freely spinning on the shaft in a direction opposite to said raising gear, a gear fixed to said shaft intermediate said raising and lowering gears, means to selectively engage said fixed gear with the said raising and lowering gears to rotate the said shaft, a pair of gears mounted on the shaft in spaced relation, a pair of transverse shafts supported by the said frame, a torque transmitting means mounted on each of the said transverse shafts and engaging with each of the last mentioned gears, a pair of devices mounted on each of the transverse shafts in spaced relation, each of said devices being adapted to engage one of the said track-connected wheel assemblies when the transverse shaft on which it is mounted is rotated, and means to disconnect the track-connected drive wheel assemblies from the main drive mechanism.

9. In a mobile unit having a power unit, a supporting frame and a main drive mechanism; a plurality of pairs of freely suspended track-connected drive wheel assemblies, power take-off means from the power unit to raise the said pairs of track-connected wheel assemblies; said power take-off means comprising a shaft extending longitudinally of the supporting frame, a raising gear provided with a clutch surface and freely spinning on said shaft, a lowering gear provided with a clutch surface and freely spinning on said shaft in a direction opposite to said raising gear, a clutch member rigidly fixed to said shaft intermediate said raising and lowering gears, means to selectively engage the clutch surface of said clutch member with said raising and lowering gears to rotate the longitudinal shaft, a pair of worm gears mounted on said longitudinal shaft in spaced relation, a pair of transverse shafts supported by the said frame, a torque transmitting means on each of said transverse shafts and engaging with each of said worm gears, a pair of devices mounted on each of the said transverse shafts in spaced relation, means associated with each of the wheel assemblies, each of said devices being adapted to engage one of the said means to raise the said track-connected wheel assemblies when the transverse shafts are rotated, and clutch means to disconnect the track-connected wheel assemblies from the main drive mechanism.

10. In a mobile unit having a power unit, a supporting frame and a main drive mechanism; a plurality of pairs of freely suspended track-connected drive wheel assemblies; each of which supports a portion of the weight of the mobile unit against tension of a compression unit; means to supply pressure to each compression unit; means to relieve the pressure in each compression unit; power take-off means from the power unit to raise the said pairs of track-connected drive wheel assemblies; said power take-off means comprising a shaft extending longitudinally of the supporting frame, a raising gear provided with a clutch surface and freely spinning on said shaft, a lowering gear provided with a clutch surface and freely spinning on said shaft in a direction opposite to said raising gear, a clutch member fixed to the longitudinal shaft intermediate said raising and lowering gears, means to selectively engage the clutch surface of said clutch member with the said raising and lowering gears to rotate the longitudinal shaft, a pair of worms mounted on said longitudinal shaft in spaced relation, a pair of transverse shafts supported by the said frame, torque transmitting means mounted on each of the said transverse shafts and engaging with each of the said worms, a crank mounted on both ends of each of said transverse shafts, a flange mounted on each of the track-connected wheel assemblies, each of said cranks being adapted when rotated in one direction to engage one of the said flanges and raise the wheel assembly, and a clutch member associated with said longitudinally extending shaft and designed to disconnect the said track-connected wheel assemblies from the main drive mechanism when the wheel assemblies are in raised position.

FLOYD DE L. BROWN.